BEST AVAILABLE COPY 82-40

July 3, 1923.

Re. 15,643

J. J. THACHER

LATHE CHUCK

Orig 1446,075

Original Filed May 28, 1921

Inventor
J. J. Thacher

By Laurie & [illegible]

Examine

Reissued July 3, 1923. Re. 15,643

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

LATHE CHUCK.

Original No. 1,446,075, dated February 20, 1923, Serial No. 473,373, filed May 28, 1921. Application for reissue filed April 6, 1923. Serial No. 630,410.

*To all whom it may concern:*

Be it known that I, JOHN J. THACHER, a citizen of the United States, residing at Wethersfield, in the county of Hartford and State of Connecticut, have invented certain new and useful Improvements in Lathe Chucks, of which the following is a specification.

This invention relates to chucks and particularly to a work driving chuck for use on automatic lathes.

It is an object of the invention to provide an improved chuck of the above type which is of very compact construction, strong and rigid in operation and easily manufactured and assembled.

Another object of the invention is to provide a chuck comprising a plurality of readily interchangeable parts including a plurality of work engaging jaws of simple design, easy to manufacture and assemble and which in the driving operation are backed up rigidly by a solid portion of the chuck.

Another object of the invention is to provide a work driving chuck which may be readily adjusted to adapt the same for use on work pieces of different diameters.

A further object of the invention is to provide an improved work driving chuck of the above type comprising a plurality of work driving jaws floatingly mounted on the chuck in a manner adapting the same to readily grip and drive the work even though the latter is somewhat irregular in form, the jaws and floating portion of the chuck however being permitted to float only during the work gripping action, such parts being centered with the chuck and held so centered when the jaws are either in an open or a closed position.

With these and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Figure 1:
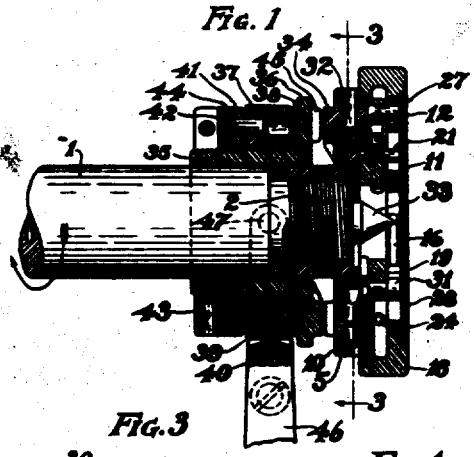
Figure 1 is a longitudinal sectional view of a chuck comprising the present invention, such view being taken on line 1—1 of Fig. 2.

The invention, in a broad aspect, comprises a work driving chuck combining means for supporting and rigidly backing up a plurality of work engaging and driving jaws, means for driving the jaws, means normally holding the jaws in a closed work gripping position and means for opening the jaws against the action of the last mentioned means during the rotation of the chuck. As illustrated in the drawing, the invention also comprises means whereby the radial position of the jaws in the chuck may be varied to adapt the same for operation on work pieces of varying diameters. From the drawing and description herein, it will be obvious that the several parts comprising the chuck are simple and easy to manufacture, also that the jaws and other working parts may be readily interchanged and the chuck assembled or disassembled with ease. The details illustrative of the invention will now be described.

Figure 3:
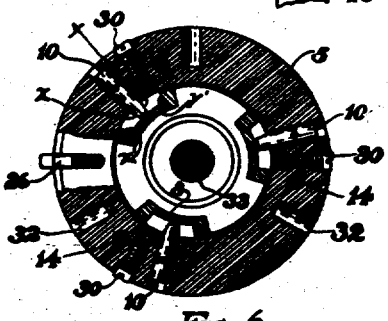
Fig. 3 is a transverse sectional view thereof taken on line 3—3 of Fig. 1.
Figure 4:
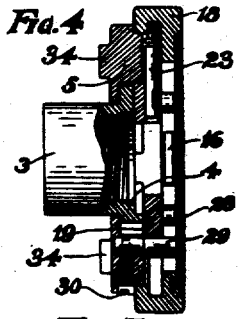
Fig. 4 is a longitudinal sectional view of the chuck taken on line 4—4 of Fig. 2.
Figure 5:
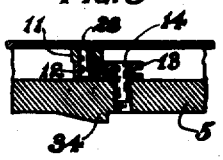
Fig. 5 is a fragmentary sectional view taken on line 5—5 of Fig. 2.
Figure 6:
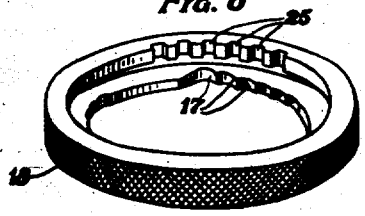
Fig. 6 is a rear perspective view of the chuck ring.
Figure 7:
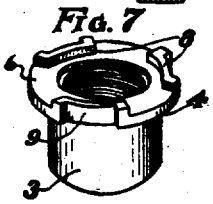
Fig. 7 is a front perspective view of the main chuck driving member adapted to be mounted on a driving spindle.
Figure 9:
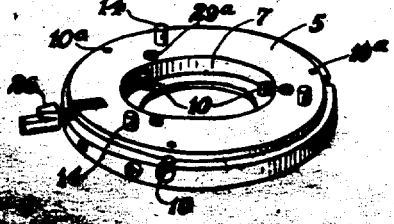
Fig. 9 is a front perspective view of the rear body portion of the chuck.
Figure 10:
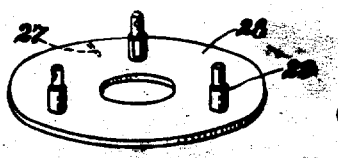
Fig. 10 is a rear perspective view of the chuck cover plate.

In the drawing, I have illustrated my invention in connection with the live spindle 1 of a lathe, the forward end of the spindle being reduced and threaded at 2 to receive the sleeve-like body portion 3 of the main chuck driving member 4. A plate-like element 5, shown in Fig. 9, is mounted on the member 4, the flanged head 6 of the member 4 resting within a recess 7 in the element 5. The member 4 is formed with three projections 8, each provided with a recess 9 therein. Three studs 10, pinned in the element 5 by means of pins $10^a$, engage within the said recesses 9 as illustrated in Fig. 3. The studs 10 do not extend quite to the bottoms of the recesses 9 whereby the element 5, supported on the studs 10, has a slight radial looseness or floating action on the member 4. Each stud 10 is beveled at $x$ and $y$ to engage the end walls $x'$ and $y'$ respectively of its recess 9. By this construction, the element 5 has a floating action when the studs are intermediate the end walls of the recesses, but when the studs engage either of such walls, the chuck being in rotation, the element 5 is automatically centered and held against radial movement on the main member 4. It will be understood that the beveled surfaces $x$, $x'$ and $y$, $y'$ act on the three studs 10 to center and hold the element 5 in the manner of a three-point support. The particular advantages of this construction will be hereinafter described.

A plurality of work driving jaws 11 are each pinned at 12 to a link or lever 13 each in turn pivoted on a pin 14 secured in the element 5. The jaws are each provided with an arcuate rear end 15 and an eccentric work engaging forward end 16. The rear end 15 of each jaw is adapted to seat in a recess 17 illustrated as provided in a separate ring element 18 in the chuck, a plurality of such recesses preferably being provided as hereinafter described.

Figure 2:
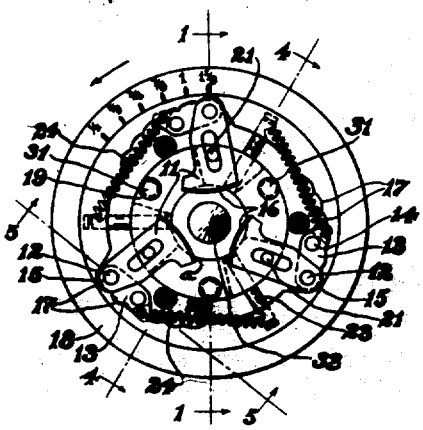
Fig. 2 is a front elevation of the chuck, the cover plate being removed.
Figure 8:
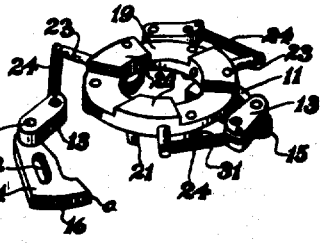
Fig. 8 is a rear perspective view of the work driving jaws and the driving member therefor, such member being adapted to be driven by the main driving member.

The jaw driving element 19, illustrated in Fig. 8, comprises a ring shaped member provided with three projections 20 adapted to seat on the member 4 loosely between projections 8 and to be driven thereby. Three pins 21 seated in element 19 are each adapted to engage a longitudinal slot 22 in the jaw 11 whereby the jaws are driven in the work driving operation. Three pins 23 seated radially in element 19 are connected by springs 24 to one end of links 13. The function of these springs is two-fold. Such springs operate to rotate the links or levers 13 about their pivots 14 in a manner to normally hold the jaws 11 seated in their recesses 17. The springs also tend to rotate element 5 relative to element 19 in a manner to normally hold the studs 10 at the ends $x'$ of the recesses 9, wherein the jaws 11 are held in a closed work gripping position. Referring to Fig. 2, it will be seen that the springs 24 tend to rotate element 19 to the right and element 5 to the left. However, the element 19 being anchored and element 5 being free for a limited rotation, the element 5 and the outer ends of the jaws will be rotated to the left and move the jaws about pins 21 and the high portions $a$ of the jaws toward the center of the chuck and the ends 16 thereof into gripping engagement with the work.

As above stated, the ring element 18 is illustrated as provided with a plurality of recesses 17 therein. A series of such recesses of progressively increasing depth is provided adjacent each jaw which jaw is adapted to be seated in any one of such recesses and in operation to pivot therein as a fulcrum. In Fig. 2 the jaws are illustrated as seated in the deepest recesses and the chuck thereby adapted to operate on the maximum sized work. The index marks $\frac{1}{2}$, $\frac{5}{8}$, $\frac{3}{4}$, $\frac{7}{8}$, 1, $1\frac{1}{8}$ on the ring indicate the sizes of work which may be driven and correspond to a like number of notches 25 in the ring which notches are adapted to be engaged by a latch 26 mounted in and normally spring pressed outwardly from the element 5. As will be understood, the jaws of the chuck may be quickly set to operate on work of any size, within the range indicated by the scale, merely by pressing the latch inwardly and rotating the ring to place the jaws in the proper recesses. The latch locks the parts in any of the adjusted positions. An index mark 27 on a cover plate 28 is adapted to register with any of the index marks of the scale to indicate the setting of the jaws.

The cover plate 28 is held in position by a plurality of pins 29 therein extending into holes $29^a$ and engaged by transverse securing screws 30 extending radially into the element 5. A plurality of spacing pins 31 seated in element 19 hold the cover plate in spaced relation to the jaws. Radial sockets 32 in the chuck are adapted to receive a tool for removing the chuck from the spindle 1.

As stated above, the element 5, in the mid position illustrated in Fig. 3, is free for a limited radial or floating movement on the supporting member 4. The ring 18 which backs up the jaws 11 is mounted on and moved with the element 5. This construction permits the jaws to adjust themselves to the work even though the latter is not exactly concentric to the center 33 on the spindle 1. When the jaws are not engaged with a piece of work or when work is being inserted into the chuck, it is desirable that the floating member and jaws be held in a concentric or centered position in the chuck. When the parts 4 and 5 are in either of their extreme relative positions (with studs 10 at $x'$ or $y'$) such parts and the jaws 11 are centered and held secured in such position. With the studs 10 at $x'$, the jaws are in the closed position and with the studs at $y'$ the jaws are in an open position. It will be understood that with this construction these parts are held in a central position when the jaws are open or closed, such parts being permitted to float only in the intermediate position when a piece of work is being gripped. Such construction prevents wobbling of the chuck when the jaws are wide open and work is being fed thereinto and should the machine for some reason fail to feed a blank into the chuck, the jaws will move to the extreme closed position and the chuck will center itself and run true without any wobbling.

In operation the chuck rotates in the direction of the curved arrow shown in Fig. 2. The jaws 11 are normally held closed or in driving contact with the work by the springs 24 as has been described. The driving power from the spindle 1 to the jaws 11 is through the member 4, jaw driving member 19 and pins 21. The means for opening the jaws 11 and the operation thereof will now be described.

Upon the inner side of the element 5 are two projections or lugs 34, and these projections present a convenient means to be engaged by a suitable intermittently operable device for arresting the turning of the said element 5 with the jaw driving member 19, and when this occurs the jaws 11 through the intermediate parts will be opened against the action of the springs 24. There are, of course, other ways in which the motion of the element 5 with respect to the jaw driving member might be arrested but the said projections in connection with a cooperating member which I will hereinafter describe answer satisfactorily in this respect.

Loosely mounted on the forward portion of the spindle 1 is a sleeve 35 provided at its forward end with an inner flange 36. Encircling and slidable on said sleeve is a ring 37 and between said ring and flange 36 is a body 38 of suitable frictional material, such as leather, the ring 37, frictional material 38 and flange 36 being pressed together by one or more springs 39, seated in sockets 40 in said ring 37 and bearing against the bottoms of the sockets and also against a disk 41 surrounding the sleeve 35. The disk 41 is provided with one or more guide pins 42 which fit in bores in the ring 37 to prevent turning of the disk and ring. Non-rotatably fitting the said sleeve is a collar 43 and between said collar and disk 41 is a body 44 of frictional material. On the front face of the flange 36 are projections 45 cooperating with the projections 34. The two sets of projections are shown out of contact in Fig. 1, but it will be evident that when the projections 45 are moved into the path of the projections 34, the motion of the element 5 will be arrested when the projections 34 engage the projections 45 to effect the opening of the jaws 11. As a means for shifting the sleeve 35, a lever 46 may be utilized. I have not deemed it necessary to show the mounting of this lever and while it may be either operated by hand or automatically, it will in the case of a lathe be operated automatically. The lever 46 is connected at 47 with the ring 37. It will be apparent that when the lever is swung to the right, Fig. 1, the jaws 11 will be opened through the agency of the intermediate parts, while the opposite motion of the said lever will release the jaws so that they can be closed by the power of the springs 24.

It will be evident that I provide in effect two members and interposed friction means between the two and that one of these members turns with respect to the other. The ring 37 and disk 41 constitute together one of said members, while the other is composed of the sleeve 35 and the collar 43, the sleeve 35 and the collar 43 being turnable with respect to said ring 37 and disk 41. The frictional resistance exerted by the two washers 38 and 44 is greater than the force of the springs 24 so that when the projections 45 arrest the projections 34 in the manner already described, the jaws will be fully opened, but when said jaws have been opened to their maximum extent and when the studs 10 have encountered the end walls $y'$ of the recesses 9, the sleeve 35 and collar 43 will slide on the leather washers 38 and 44 and thereafter turn with respect to the ring 37 and disk 41, the jaws 11 remaining open. It will be understood that the instant the projections 45 are moved out of engagement with the projections 34, the jaws 11 will be automatically closed by the springs 24.

What I claim is:

1. A work driving chuck comprising the combination of a plurality of work engaging jaws, an element adapted to engage the end surfaces of the jaws so that they may be oscillated substantially about such surfaces as a fulcrum, a driving element, and means operatively connecting the driving element to the jaws to drive the work.

2. A work driving chuck comprising the combination of a plurality of work engaging jaws, an element adapted to engage the end surfaces of the jaws so that they may be oscillated about such surfaces as a fulcrum, a driving element, and means operatively connecting the driving element to the jaws at a point remote from their end surfaces to drive the work.

3. A work driving chuck comprising the combination of a plurality of work engaging jaws, an element adapted to engage the jaws so that they may be oscillated about substantially their end surfaces as a fulcrum, a driving element engaging an intermediate portion of each of said jaws, and means operatively connecting the driving element to the jaws to drive the work.

4. A work driving chuck comprising the combination of a plurality of work engaging jaws, an element having a recess therein adjacent each jaw, the jaws being adapted to seat in the said recesses and each in operation to pivot in its recess as a fulcrum, a driving element, and means operatively connecting the driving element to the jaws to drive the work.

5. A work driving chuck comprising the combination of a plurality of work engaging jaws, an element having a recess therein adjacent each jaw, the jaws being adapted to seat in the said recesses and each in operation to pivot in its recess as a fulcrum, and a driving element relatively rotatable within the first named element and operatively connected to the jaws to drive the work.

6. A work driving chuck comprising the combination of a plurality of work engaging jaws, an element having a recess therein adjacent each jaw, the jaws being adapted to seat in the said recesses and each in operation to pivot in its recess as a fulcrum, a driving element relatively rotatable within the first named element, and lugs on the driving element engaging slots in the jaws for driving the work.

7. A work driving chuck comprising the combination of a plurality of work engaging jaws, an element having a recess therein adjacent each jaw, the jaws being adapted to seat in the said recesses and each in operation to pivot in its recess as a fulcrum, means normally keeping the jaws in a closed work gripping position, a driving element, and means operatively connecting the driving element to the jaws to drive the work.

8. A work driving chuck comprising the combination of a plurality of work engaging jaws, an element having a recess therein adjacent each jaw, the jaws being adapted to seat in the said recesses and each in operation to pivot in its recess as a fulcrum, means normally keeping the jaws in a closed work gripping position, means for opening the jaws against the action of the last mentioned means during the rotation of the chuck, and means operatively connecting the driving element to the jaws to drive the work.

9. A work driving chuck comprising the combination of a driving member, a plurality of work engaging jaws, means floatingly mounted on the driving member and having a recess therein adjacent each jaw, the jaws being adapted to seat in the said recesses and each in operation to pivot in its recess as a fulcrum, means normally keeping the jaws in a closed work gripping position, and means for opening the jaws against the action of the last mentioned means during the rotation of the chuck.

10. A work driving chuck comprising the combination of a driving member, a plurality of work engaging jaws, means normally keeping the jaws in a closed work gripping position, means for opening the jaws against the action of the last mentioned means during the rotation of the chuck, and means holding the jaws centered relative to the chuck when the jaws are in either a closed or an open position but permitting the jaws to have a slight radial floating action when the jaws are in an intermediate position.

11. A work driving chuck comprising the combination of a driving member, a plurality of work engaging jaws, means mounted on the driving member and having a recess therein adjacent each jaw, the jaws being adapted to seat in the said recesses and each in operation to pivot in its recess as a fulcrum, means normally keeping the jaws in a closed work gripping position, and means for opening the jaws against the action of the last mentioned means during the rotation of the chuck, the first named means being mounted to permit the jaws to have a floating action when the jaws are between the open and closed position and being adapted to center the jaws as the same move into the open or closed positions from an intermediate position.

12. A work driving chuck comprising the combination of a plurality of radially disposed work engaging jaws, an element adapted to engage the jaws so that they may be oscillated about substantially their end surfaces as a fulcrum, means to adjust the radial positions of said jaws, a driving element, and means operatively connecting the driving element to the jaws to drive the same.

13. A work driving chuck comprising the combination of a plurality of radially disposed work engaging jaws, an element adapted to engage the end surfaces of the jaws so that they may be oscillated about their end surfaces as a fulcrum, means to adjust the radial positions of said jaws, a driving element, and means operatively connecting the driving element to the jaws to drive the same.

14. A work driving chuck comprising the combination of a plurality of work engaging jaws, an element having the jaws mounted thereon, an element having a plurality of recesses of varying depth adjacent each jaw, each jaw being adapted to be seated in any one of the said recesses adjacent thereto and in operation to pivot in such recess as a fulcrum, and an element operatively connected to the jaws to drive the same.

15. A work driving chuck comprising the combination of a plurality of work engaging jaws, an element having the jaws mounted thereon, an element having a plurality of recesses of varying depth adjacent each jaw, each jaw being adapted to be seated in any one of the said recesses adjacent thereto and in operation to pivot in such recess as a fulcrum, an element operatively connected to the jaws to drive the same, and means for adjustably securing the first and second elements against relative rotation with the jaws seated in any of the said recesses.

16. A work driving chuck comprising the combination of a body portion, a plurality of work engaging jaws on the body portion, and a ring surrounding the body portion and provided with a plurality of recesses of varying depth adjacent each jaw, each jaw being adapted to be seated in any one of the said recesses adjacent thereto and in operation to pivot in such recesses as a fulcrum.

17. A work driving chuck comprising the combination of a body portion, a plurality of work engaging jaws on the body portion, a ring surrounding the body portion and provided with a plurality of recesses of varying depth adjacent each jaw, each jaw being adapted to be seated in any one of the said recesses adjacent thereto and in operation to pivot in such recess as a fulcrum, and means for adjustably securing the ring and body portion against relative rotation with the jaws seated in any of the said recesses.

18. A work driving chuck comprising the combination of a body portion, a plurality of work engaging jaws on the body portion, and a ring surrounding the body portion and provided with a plurality of recesses of varying depth adjacent each jaw, each jaw being adapted to be freely seated in any one of the said recesses adjacent thereto and to pivot in such recess and have backing against the wall of the recess in the work driving operation.

19. A work driving chuck comprising the combination of a body portion, a plurality of work engaging jaws on the body portion, a ring surrounding the body portion and provided with a plurality of recesses of varying depth adjacent each jaw, each jaw being adapted to be freely seated in any one of the said recesses adjacent thereto and to pivot in such recess and have backing against the wall of the recess in the work driving operation, and means normally keeping the jaws seated in their respective recesses.

20. A work driving chuck comprising the combination of a body portion, a plurality of work engaging jaws on the body portion, a ring surrounding the body portion and provided with a plurality of recesses of varying depth adjacent each jaw, each jaw being adapted to be freely seated in any one of the said recesses adjacent thereto and to pivot in such recess and have backing against the wall of the recess in the work driving operation, spring means operatively connected to the jaws and adapted to normally keep the jaws seated in their respective recesses, and means for adjustably securing the ring and body portion against relative rotation with the jaws seated in any of the said recesses.

21. A work driving chuck comprising the combination of a body portion, a plurality of work engaging jaws on the body portion, a ring surrounding the body portion and provided with a plurality of recesses of varying depth adjacent each jaw, each jaw being adapted to be seated in any one of the said recesses adjacent thereto and in operation to pivot such recess as a fulcrum, and means in the body portion operatively connected to the jaws for driving the same in operation.

22. A work driving chuck comprising the combination of a body portion, a plurality of work engaging jaws on the body portion, a ring surrounding the body portion and provided with a plurality of recesses of varying depth adjacent each jaw, each jaw being adapted to be seated in any one of the said recesses adjacent thereto and in operation to pivot in such recess as a fulcrum, means for holding the jaws in their respective recesses, and means relatively rotatable within the body portion and operatively connected to the jaws for driving the same in operation.

23. A work driving chuck comprising the combination of a plurality of work engaging jaws, an element having the jaws mounted thereon, an element having a plurality of recesses of varying depth adjacent each jaw, each jaw being adapted to be seated in any one of the said recesses adjacent thereto and in operation to pivot in such recess as a fulcrum, means normally keeping the jaws in a closed work gripping position, means for opening the jaws against the action of the last mentioned means during the rotation of the chuck, and an element operatively connected to the jaws to drive the same.

24. A work driving chuck comprising the combination of a plurality of work engaging jaws, an element having the jaws mounted thereon, an element having a plurality of recesses of varying depth adjacent each jaw, each jaw being adapted to be freely seated in any one of the said recesses adjacent thereto and in operation to pivot in such recess as a fulcrum, an element operatively connected to the jaws to drive the same, and spring means operative between the jaws and the last named element for normally keeping the jaws seated in their respective recesses.

25. A work driving chuck comprising the combination of a plurality of work engaging jaws, an element having the jaws mounted thereon, an element having a plurality of recesses of varying depth adjacent each jaw, each jaw being adapted to be freely seated in any one of the said recesses adjacent thereto and in operation to pivot in such recess as a fulcrum, an element operatively connected to the jaws to drive the same, and spring means operative between the jaws and the last named element for normally keeping the jaws in a closed work gripping position.

26. A work driving chuck comprising the combination of a plurality of work engaging jaws, an element having the jaws mounted thereon, an element having a plurality of recesses of varying depth adjacent each jaw, each jaw being adapted to be freely seated in any one of the said recesses adjacent thereto and in operation to pivot in such recess as a fulcrum, an element operatively connected to the jaws to drive the same, and spring means for normally keeping the jaws seated in their respective recesses and in a closed work gripping position.

27. A work driving chuck comprising the combination of a plurality of work engaging jaws, an element having the jaws mounted thereon, an element having a plurality of recesses of varying depth adjacent each jaw, each jaw being adapted to be freely seated in any one of the said recesses adjacent thereto and in operation to pivot in such recess as a fulcrum, an element operatively connected to the jaws to drive the same, and spring means operative between the jaws and the last named element for normally keeping the jaws seated in their respective recesses and in a closed work gripping position.

28. A work driving chuck comprising the combination of a driving member, a plurality of work engaging jaws, means mounted on the driving member and operatively connected to the jaws, means for setting the jaws in any one of a plurality of definite positions radially of the chuck whereby to adapt the same to operate on work pieces of different diameters, means normally closing the jaws, and means for opening the jaws against the action of the last mentioned means during the rotation of the chuck.

29. A work driving chuck comprising the combination of a driving member, a plurality of work engaging jaws, means floatingly mounted on the driving member and operatively connected to the said jaws, means for setting the jaws in any one of a plurality of definite positions radially of the chuck whereby to adapt the same to operate on work pieces of different diameters, means normally closing the jaws, and means for opening the jaws against the action of the last mentioned means during the rotation of the chuck.

30. A work driving chuck comprising the combination of a driving member, a plurality of work engaging jaws, means mounted on the driving member and operatively connected to the jaws, means for setting the jaws in any one of a plurality of definite positions radially of the chuck whereby to adapt the same to operate on work pieces of different diameters, means normally closing the jaws, means for opening the jaws against the action of the last mentioned means during the rotation of the chuck, and means holding the jaws centered relative to the chuck when the jaws are in either a closed or an open position but permitting the jaws to have a slight radial floating action when the jaws are in an intermediate position.

31. A work driving chuck comprising the combination of a driving member, a plurality of work engaging jaws, means mounted on the driving member and operatively connected to the jaws, means for setting the jaws in any one of a plurality of definite positions radially of the chuck whereby to adapt the same to operate on work pieces of different diameters, means normally closing the jaws, means for opening the jaws against the action of the last named means during the rotation of the chuck, and means permitting the first named means and jaws to have a floating action when the jaws are between the open and closed position and being adapted to center the jaws as the same move into the open or closed positions from an intermediate position.

32. A work driving chuck comprising the combination of an outer element, a plurality of work engaging and driving jaws housed within and pivoted on the outer element, and an inner element operatively connected to the jaws for driving the work.

33. A work driving chuck comprising the combination of a body portion, a plurality of work engaging jaws movably mounted thereon, the inner ends of the jaws being adapted to engage a work piece to drive the same, and means engaging the jaws intermediate the ends thereof for driving the work.

34. A work driving chuck comprising the combination of a body portion, a plurality of work engaging jaws pivotally mounted thereon, the inner ends of the jaws being eccentric-shaped and adapted to engage a work piece to drive the same, and means engaging the jaws intermediate the ends thereof for driving the work.

35. A work driving chuck comprising the combination of a body portion, a plurality of work engaging jaws pivotally mounted thereon, the inner ends of the jaws being eccentric-shaped and adapted to engage a work piece to drive the same, means for engaging the jaws with the work, and means operatively connected to the jaws intermediate the ends thereof for driving the work.

36. A work driving chuck comprising the combination of a body portion, a plurality of work engaging jaws pivotally mounted thereon, the inner ends of the jaws being eccentric-shaped and adapted to engage a work piece to drive the same, spring means for normally engaging the jaws with the work, means operatively connected to the jaws intermediate the ends thereof for driving the work, and means for opening the jaws against the action of the spring means during the rotation of the chuck.

37. A work driving chuck comprising the combination of an outer element, an inner element therein, a plurality of work engaging jaws within the outer element, the jaws being operatively connected to both elements, spring means normally operative to relatively move the elements in a direction to close the jaws inwardly, and means for opening the jaws against the action of the spring means during the rotation of the chuck.

38. A work driving chuck comprising the combination of an outer element, an inner element therein, a plurality of work engaging jaws within the outer element, the jaws being operatively connected to both elements, means for supporting and rotating the chuck, spring means normally operative to rotate the outer element in the forward direction relative to the inner element and thereby close the jaws inwardly to the work, and means for retarding the rotation of the outer element to open the jaws.

39. A work driving chuck comprising the combination of an outer element, an inner element therein, a plurality of work engaging jaws within the outer element, the inner work engaging ends of the jaws being eccentric-shaped and the jaws being operatively connected to both elements, spring means normally operative to relatively move the elements in a direction to pivotally move the jaws in a manner to cam their ends into driving engagement with the work, and means for relatively moving the elements and jaws against the action of the spring means to disengage the jaws from the work during the rotation of the chuck.

40. A work driving chuck comprising the combination of an outer element, an inner driving element, a plurality of work engaging jaws movable on the outer element, the jaws each being provided with a slot therein, and a plurality of pins on the inner element each operatively engaged within a slot to drive the work.

41. A work driving chuck comprising the combination of a housing having an open front face, a plurality of work engaging jaws supported therein, means engaging the jaws within the housing for driving the same, and a cover plate fitting over the said front face and serving to both house and hold the several parts of the chuck assembled.

42. A work driving chuck comprising the combination of a housing having an open front face, a plurality of work engaging jaws supported therein, means engaging the jaws within the housing for driving the same, and a cover plate fitting over the said front face to enclose the same, the cover plate having holding pins thereon extending through the chuck and secured to the rear portion thereof whereby to hold the several parts of the chuck assembled.

43. A work driving chuck comprising the combination of a body portion, a link pivoted thereto, a work driving jaw connected to one end of the link, a spring connected to the other end of the link and adapted to hold the jaw seated rearwardly against an abutment on the body portion, and means within the body portion for driving the jaw.

44. A work driving chuck comprising the combination of a body portion, a plurality of work engaging jaws mounted thereon and seated in recesses therein, spring means for normally holding the jaws seated in the recesses and in the closed work engaging position, and means for opening the jaws against the action of the spring means.

45. A work driving chuck comprising the combination of a body portion, a plurality of work engaging jaws mounted thereon and seated in recesses therein, an inner driving element operatively connected to the jaws, spring means normally operative to rotate the body portion in one direction relative to the driving element to hold the jaws seated in their recesses and in the closed work engaging position, and means for causing a relative rotation of the body portion in the opposite direction to open the jaws.

46. A work driving chuck comprising the combination of an outer element, a plurality of work engaging and driving jaws pivoted on the outer element, an inner element operatively connected to the jaws for driving the same, and means whereby the jaws may be adjusted to different definite radial positions for driving different sized work.

47. A work driving chuck comprising the combination of a body portion, a plurality of work engaging jaws pivotally mounted thereon, the inner ends of the jaws being eccentric-shaped and adapted to engage a work piece to drive the same, means engaging the jaws intermediate the ends thereof for driving the work, and means whereby the jaws may be adjusted radially for driving different sized work.

48. A work driving chuck comprising the combination of a body portion, a plurality of work engaging jaws pivotally mounted thereon, the inner ends of the jaws being eccentric-shaped and adapted to engage a work piece to drive the same, spring means for normally engaging the jaws with the work, means operatively connected to the jaws intermediate the ends thereof for driving the work, means for opening the jaws against the action of the spring means during the rotation of the chuck, and means whereby the jaws may be adjusted radially for driving different sized work.

49. A work driving chuck comprising the combination of an outer element, an inner element therein, a plurality of work engaging jaws, the jaws being operatively connected to both elements, spring means normally operative to relatively move the elements in a direction to close the jaws inwardly, means for opening the jaws against the action of the spring means during the rotation of the chuck, and means whereby the jaws may be adjusted radially for driving different sized work.

50. A work driving chuck comprising the combination of an outer element, an inner element therein, a plurality of work engaging jaws, the jaws being operatively connected to both elements, means for supporting and rotating the chuck, spring means normally operative to rotate the outer element in the forward direction relative to the inner element and thereby close the jaws inwardly to the work, means for retarding the rotation of the outer element to open the jaws, and means whereby the jaws may be adjusted radially for driving different sized work.

51. A work driving chuck comprising the combination of an outer element, an inner element therein, a plurality of work engaging jaws, the inner work engaging ends of the jaws being eccentric-shaped and the jaws being operatively connected to both elements, spring means normally operative to relatively move the elements in a direction to pivotally move the jaws in a manner to cam their ends into driving engagement with the work, means for relatively moving the elements and jaws against the action of the spring means to disengage the jaws from the work during the rotation of the chuck, means whereby the jaws may be adjusted radially for driving different sized work, and means for supporting and driving the chuck.

52. A work driving chuck comprising the combination of an outer element, an inner element, a plurality of work engaging jaws movable on the outer element, the jaws each being provided with a slot therein, a plurality of pins on the inner element each operatively engaged within a slot whereby to drive the jaws, and means whereby the jaws may be adjusted radially for driving different sized work.

53. A work driving chuck comprising the combination of a body member, an element adjustable thereon, a link pivoted to the member, a work driving jaw connected to one end of the link, a spring connected to the other end of the link and adapted to hold the jaw seated against the element, and means whereby adjustment of the element adjusts the jaw radially.

54. A work driving chuck comprising the combination of a body member, an outer ring-like element rotatably adjustably mounted thereon, a plurality of work engaging and driving jaws mounted on the member and housed within the element, a work driver operatively connected to the jaws within the first named element, and means whereby adjustment of the first named element on the body member operates to adjust the jaws radially for driving different sized work.

55. A work driving chuck comprising the combination of a body portion, a plurality of work engaging jaws pivotally supported thereon, the inner work engaging end of each jaw having a cam rise thereon whereby the jaws are operatively engaged with the work to drive the same, an inner driving element engaging the jaws, and means whereby the jaws may be bodily adjusted into a plurality of different radial positions, the amount of each successive adjustment being less than the cam rise on each jaw.

56. A work driving chuck comprising the combination of a body portion, a plurality of work engaging jaws movably mounted thereon and each having a work engaging surface, spring means normally operative to move the jaws inwardly to engage the work, and means for adjusting the jaws into different positions radially of the chuck whereby to adapt the same to operate on work pieces of different diameters.

57. A work driving chuck comprising the combination of a body portion, a plurality of work engaging jaws movably mounted thereon and each having an eccentric work engaging surface, spring means normally operative to move the jaws inwardly to engage the work, means for opening the jaws against the action of the spring means during the rotation of the chuck, and means for adjusting the jaws into different positions radially of the chuck whereby to adapt the same to operate on work pieces of different diameters.

58. A work driving chuck comprising the combination of a body portion, a plurality of work engaging jaws pivotally mounted thereon and each having an eccentric work engaging surface, spring means normally operative to move the jaws inwardly about their pivots to engage the work, means for opening the jaws against the action of the spring means during the rotation of the chuck, and means for adjusting the jaws into different positions radially of the chuck whereby to adapt the same to operate on work pieces of different diameters.

59. A work driving chuck comprising the combination of a body portion, a plurality of work engaging jaws pivotally mounted thereon and each having an eccentric work engaging surface, spring means normally operative to move the jaws inwardly about their pivots to engage the work, means for moving the jaws about their pivots to disengage work during the rotation of the chuck, and means for adjusting the jaws into different positions radially of the chuck whereby to adapt the same to operate on work pieces of different diameters, the construction and relation of the several parts being such that the jaws are engaged with an equal driving pressure on the work even though the latter is somewhat irregular or eccentrically mounted.

60. A work driving chuck comprising the combination of a body portion, a plurality of work engaging jaws pivotally mounted thereon and each having an eccentric work engaging surface, spring means normally operative to move the jaws inwardly about their pivots to engage the work, means for opening the jaws against the action of the spring means during the rotation of the chuck, means for adjusting the jaws into different positions radially of the chuck whereby to adapt the same to operate on work pieces of different diameters, a cover plate fitting over the front face of the chuck, and means on the chuck for holding the plate and other parts of the chuck assembled.

61. A work driving chuck comprising the combination of an outer element, a plurality of work engaging and driving jaws housed therein, an inner element within the outer element and operatively connected to the jaws to drive the same, spring means normally operative to close the jaws onto the work, and means whereby the jaws can be opened during rotation of the chuck.

62. A work driving chuck comprising the combination of an outer element, a plurality of work engaging and driving jaws housed therein, an inner element within the outer element and operatively connected to the jaws to drive the same, spring means normally operative to close the jaws onto the work, means whereby the jaws can be opened during rotation of the chuck, and means for setting the jaws in different radial positions for driving work pieces of different diameters.

63. A work driving chuck comprising the combination of an outer element, a plurality of work engaging and driving jaws housed therein, spring means normally operative to close the jaws onto the work, means whereby the jaws can be opened during rotation of the chuck, means for setting the jaws in different radial positions for driving work pieces of different diameters, and means within the outer element for forcing the jaws into an equal driving engagement with the work.

64. A work driving chuck comprising the combination, of an outer element, a plurality of work engaging and driving jaws housed therein, an inner element within the outer element and operatively connected to the jaws to drive the same, spring means normally operative to rotate the outer element in the forward direction relative to the inner element and thereby close the jaws inwardly to the work, and means for retarding the rotation of the outer element to open the jaws.

In testimony whereof, I hereto affix my signature.

JOHN J. THACHER.